US008601085B1

(12) United States Patent
Ives et al.

(10) Patent No.: US 8,601,085 B1
(45) Date of Patent: Dec. 3, 2013

(54) TECHNIQUES FOR PREFERRED PATH DETERMINATION

(75) Inventors: Stephen Richard Ives, West Boylston, MA (US); Patrick Brian Riordan, West Newton, MA (US); Arieh Don, Newton, MA (US); Assaf Natanzon, Ramat-Gan (IL); Helen S. Raizen, Jamaica Plain, MA (US)

(73) Assignee: EMC Corporation, Hopkinton, MA (US)

( * ) Notice: Subject to any disclaimer, the term of this patent is extended or adjusted under 35 U.S.C. 154(b) by 317 days.

(21) Appl. No.: 13/073,261

(22) Filed: Mar. 28, 2011

(51) Int. Cl.
*G06F 15/16* (2006.01)

(52) U.S. Cl.
USPC .......................................... 709/211; 711/114

(58) Field of Classification Search
USPC ........................... 709/239, 213–215; 711/114
See application file for complete search history.

(56) References Cited

U.S. PATENT DOCUMENTS

| | | | | |
|---|---|---|---|---|
| 5,574,855 A * | 11/1996 | Rosich et al. | ................... | 714/41 |
| 5,592,648 A * | 1/1997 | Schultz et al. | ................ | 711/114 |
| 7,788,220 B1 * | 8/2010 | Auchmoody et al. | ........ | 707/609 |
| 7,836,204 B2 * | 11/2010 | Kalos et al. | ................... | 709/239 |
| 7,949,630 B1 * | 5/2011 | Auchmoody | ................ | 707/609 |
| 8,099,549 B1 * | 1/2012 | Madnani et al. | .............. | 711/114 |
| 8,375,174 B1 | 2/2013 | Cartmell et al. | | |
| 2003/0037127 A1 * | 2/2003 | Shah et al. | ..................... | 709/220 |
| 2006/0053287 A1 * | 3/2006 | Kitamura | ....................... | 713/167 |
| 2008/0256292 A1 * | 10/2008 | Flynn et al. | .................... | 711/114 |
| 2010/0169533 A1 * | 7/2010 | Brocco et al. | ................. | 710/314 |
| 2010/0262773 A1 * | 10/2010 | Borchers et al. | ............. | 711/114 |
| 2010/0306468 A1 * | 12/2010 | Shionoya | ...................... | 711/114 |
| 2011/0029730 A1 * | 2/2011 | Durocher et al. | ............. | 711/114 |

OTHER PUBLICATIONS

Evans, Mark, Working Draft Project American National Standard, "Information technology—SCSI Block Commands—3 (SBC-3)," T10/1799-D, Reference No. ISO/IEC 14776-323:200x, Jan. 21, 2011, 282 Pages.
Cartmell, et al., "Techniques for Global Memory Management and Request Processing," U.S. Appl. No. 12/798,034, filed Mar. 29, 2010; EMS-381US; EMC-09-006.

* cited by examiner

*Primary Examiner* — Bunjob Jaroenchonwanit
(74) *Attorney, Agent, or Firm* — Muirhead and Saturnelli, LLC

(57) ABSTRACT

Described are techniques for determining preferred paths. A host requests first information from each of one or more ports of a data storage system. The first information includes preferred path information for a first device visible to the host through each port. The preferred path information includes one or more parameters used by said host to perform one or more mathematical calculations to determine a preferred path for transmitting to the data storage system a data operation directed to the first device. The first information is sent from each port to the host.

16 Claims, 15 Drawing Sheets

TECHNIQUES FOR PREFERRED PATH DETERMINATION

BACKGROUND

1. Technical Field

This application generally relates to data storage, and more particularly to techniques used for path selection when communicating with a data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

A host may communicate with a data storage system when performing a data operation such as, for example, to read or write data to a storage device. The host may be able to transmit the data operation to the data storage system over any one or more different paths. In the case where there are multiple possible paths, the host may perform processing using any one of a variety of different techniques to determine which path to select for transmitting the data operation.

SUMMARY OF THE INVENTION

In accordance with one aspect of the invention is a method for determining preferred paths. A host requests first information from each of one or more ports of a data storage system. The first information includes preferred path information for a first device visible to the host through said each port. The preferred path information includes one or more parameters used by the host to perform one or more mathematical calculations to determine a preferred path for transmitting to the data storage system a data operation directed to the first device. The first information is sent from said each port to the host. The one or more parameters of the preferred path information for the first device may include a first parameter indicating a quantity of one or more member devices comprising the first device and a second parameter indicating a size of a chunk of data stored on each of the member devices. The one or more mathematical calculations may include a first calculation to determine a stripe size using the first parameter and the second parameter and the stripe size may indicate an amount of data stored in a single row across the member devices. The one or more parameters may include a third parameter indicating a storage capacity of each of the member devices. The preferred path information for said each port for the first device may include information identifying whether said each port is included in a preferred path for each of the member devices. The preferred path information may include a list of one or more of the member devices, wherein if a first of the member devices is included in the list, said each port is included in a preferred path to the first member device. The step of requesting performed by the host may include the host issuing a request to each of the one or more ports for preferred path information about the first device. Each of the member devices may be associated with a device table. The preferred path information for said each port for the first device may include information identifying whether said each port is included in a preferred path for each of the member devices in accordance with whether the device table associated with said each member device is stored in a global memory portion included in a same physical board of the data storage system as said each port. Each of the member devices may be associated with a device table. The device table may be partitioned into a plurality of device table portions. Each of the plurality of device table portions may be stored in a global memory portion and may be associated with one of a plurality of logical address portions comprising a logical address range of the first device. The preferred path information for said each port for the first device may include information identifying whether said each port is included in a preferred path for a first of the plurality of device table portions in accordance with whether the first device table portion is stored in a global memory portion included in a same physical board of the data storage system as said each port. The first device may be a striped metadevice having its data striped in portions across the member devices, each of the portions being of the size of a chunk indicated by the second parameter. A first path to the first device may include a first of the one or more ports and the preferred path information may indicate that the first path is preferred for at least a portion of the first device if a portion of a device table for the first device is stored in a global memory portion on a same physical component board as the first port. The device table may be located in a first global memory portion on a first physical component board at a first point in time and a second global memory portion on a second physical component board different from the first physical component board at a second point in time different from the first point in time. The device table may be divided into a plurality of partitions. A first of the plurality of partitions may be stored in first global memory portion on a first of a plurality of physical boards of the data storage system and a second of the plurality of partitions may be stored in a second global memory portion on a second of the plurality of physical boards, the first board being different from the second board. Each of the plurality of physical boards may include a global memory portion and a plurality of other components, the plurality of other components including at least one component having one of the one or more ports. A logical address range of the first device as used by the host may include a plurality of logical address range portions and the one or more mathematical calculations may include one or more calculations used in connection with determining for a data operation directed to a first logical address in the logical address range which of the one or more ports are included in preferred paths for the first logical address. The one or more calculations may be used in connection with mapping the first logical address from a host logical address space of the first device to a second logical address used by the data storage system.

In accordance with another aspect of the invention is a computer readable medium comprising code stored thereon for determining preferred paths. The computer readable medium comprises code for requesting, by a host from each of one or more ports of a data storage system, first information, the first information including preferred path information for a first device visible to the host through said each port, the preferred path information including one or more parameters used by the host to perform one or more mathematical calculations to determine a preferred path for transmitting to the data storage system a data operation directed to the first device; and sending, from said each port to the host, the first information. The one or more parameters of the preferred path information for the first device may include a first parameter indicating a quantity of one or more member devices comprising the first device and a second parameter indicating a size of a chunk of data stored on each of the member devices. The one or more mathematical calculations may include a first calculation to determine a stripe size using the first parameter and the second parameter, the stripe size indicating an amount of data stored in a single row across the member devices. The one or more parameters may include a third parameter indicating a storage capacity of each of the member devices.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
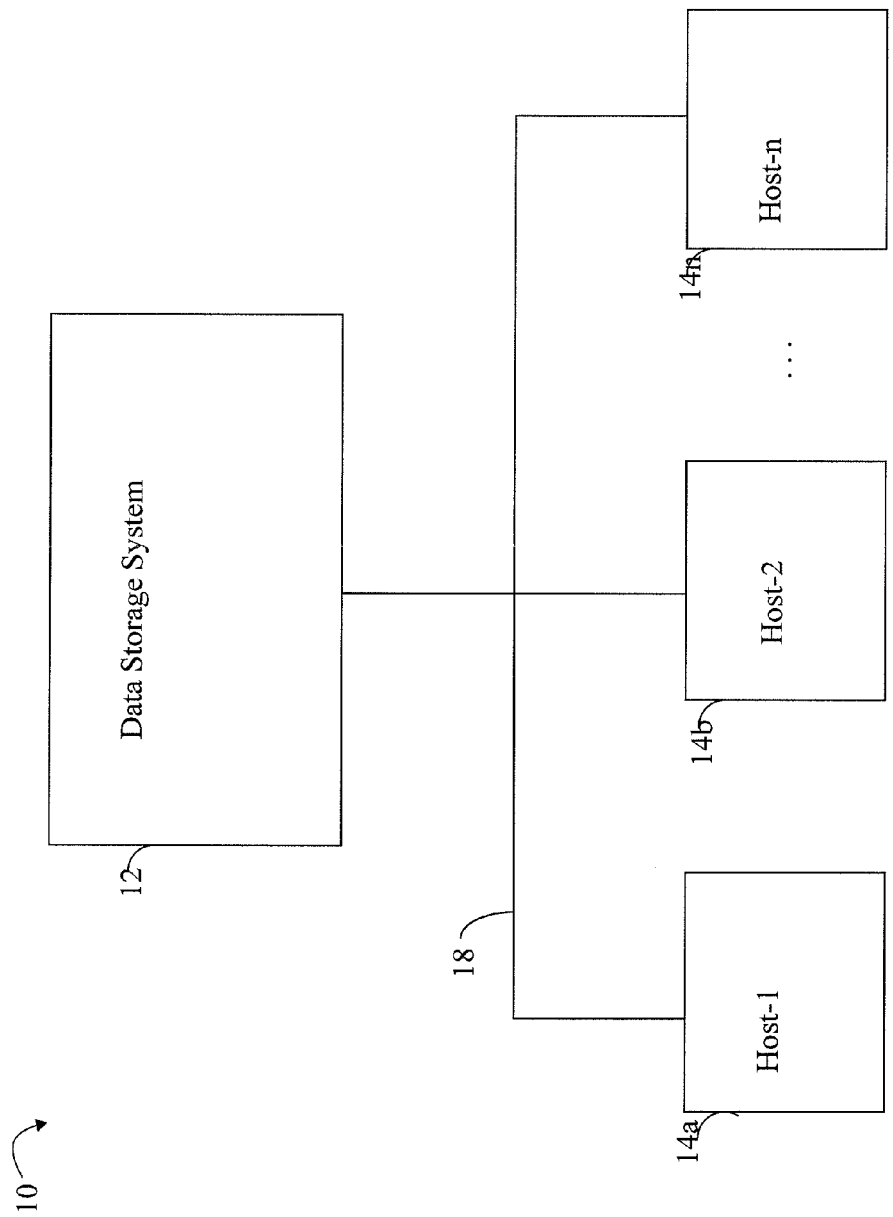
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI, Fibre Channel, Fibre Channel over Ethernet, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
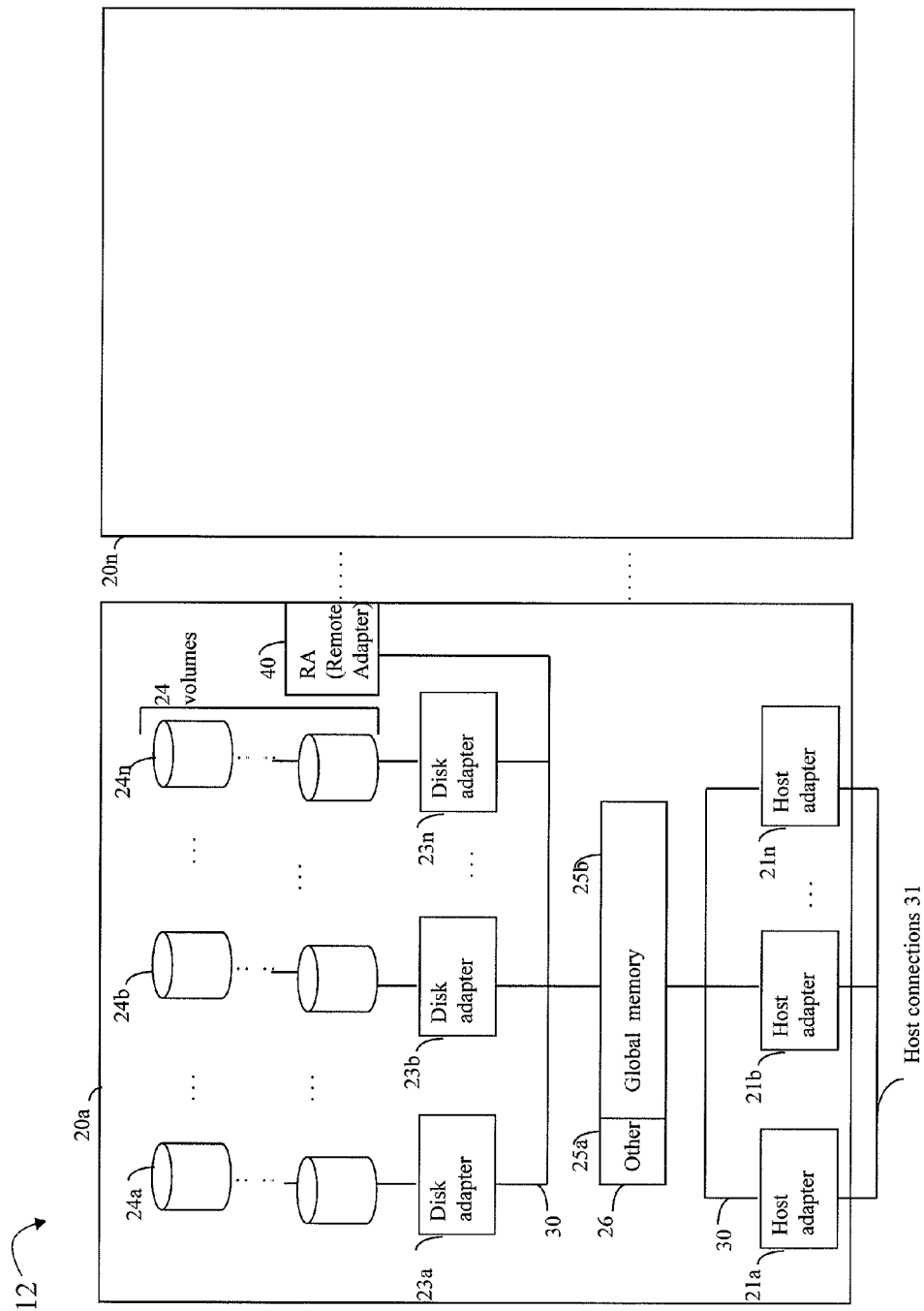
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component, such as a DA, may be characterized as a backend component. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual or physical disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. Data residing on an LV may be accessed by the DA following a data request in connection with I/O operations that other directors originate.

Figure 2B:
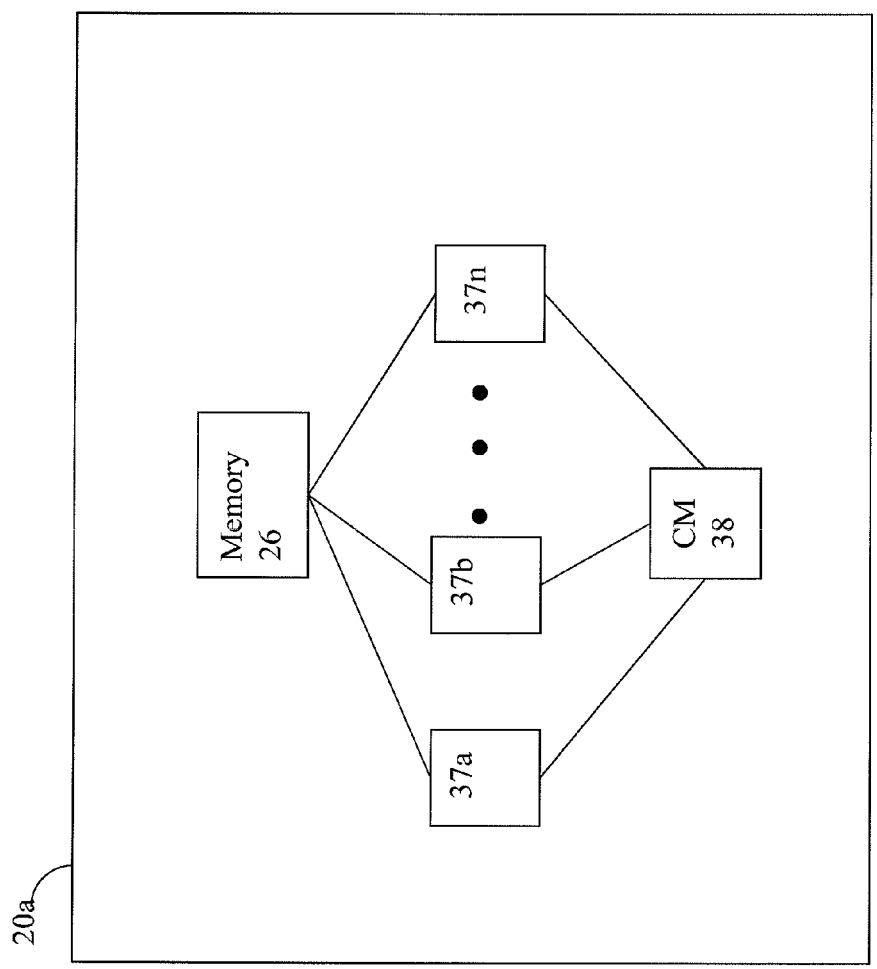
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on an LV of a data storage system, using one or more different physical paths from the host to the data storage system. Described in the following paragraphs are techniques that may be used in connection with selecting a path over which to access data of a storage device when such data is accessible over multiple paths. A host may use such techniques in connection with path selection when communicating data operations, such as I/O operations, to the data storage system.

Figure 3:
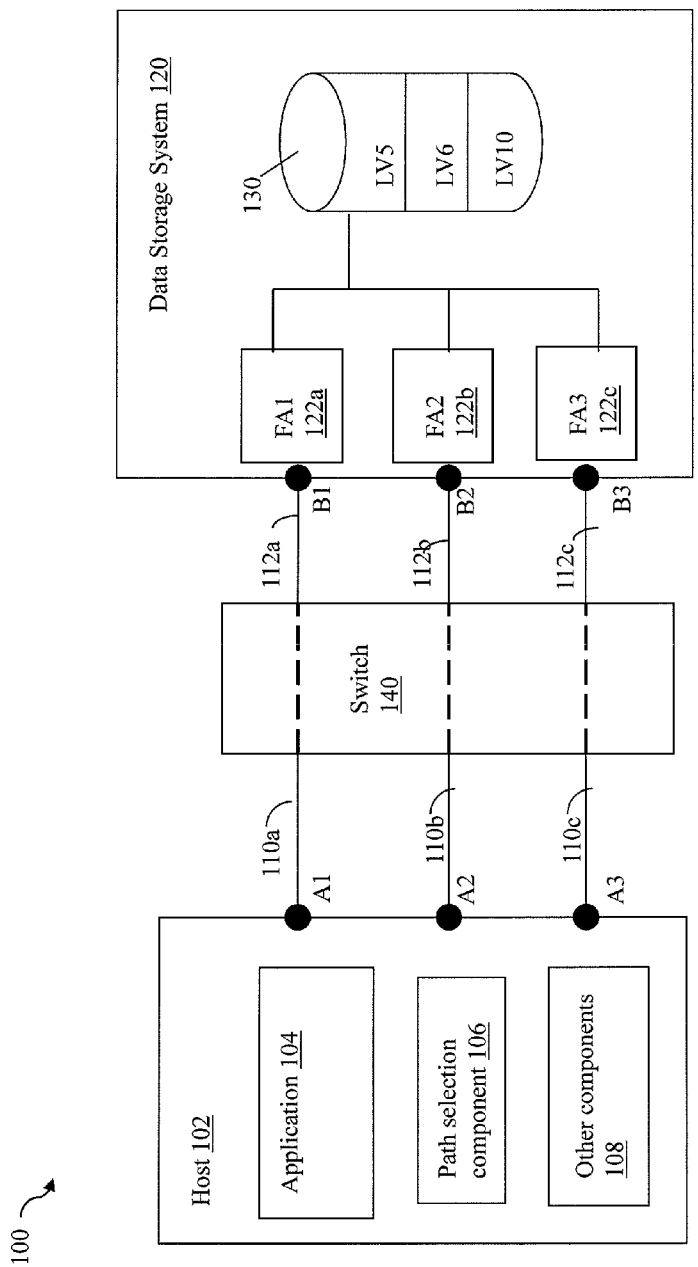
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. It should be noted that the example 100 includes only a single host, single data storage system, and a fabric including a single switch for purposes of simplicity to illustrate the techniques herein.

The host 102 may include an application 104, path selection component 106 and other components 108. An I/O operation from the application 104 may be communicated to the data storage system 120 using the path selection component 106 and one or more other components represented by element 108. The application 104 may be a database or other application which issues data operations, such as I/O operations, to the data storage system 120. Each of the I/O operations may be directed to a target device (such as device 130) configured to be accessible to the host 102 over multiple physical paths. As such, each of the I/O operations may be forwarded from the application 104 to the data storage system 120 over one of the possible multiple paths. The path selection component 106 may perform processing to select one of the possible multiple paths based on one or more criteria. For example, in one embodiment, the criteria may include whether a particular path for an I/O operation is a preferred path. Techniques for use in connection with preferred path criteria, selection, reporting, and the like, are described in more detail elsewhere herein. The path selection component 106 may be included a commercially available product such as, for example, EMC® PowerPath® software by EMC Corporation. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the path selection component 106 and also below the path selection component 106. For example, application 104 may issue an I/O operation which is communicated in a call stack including an LVM, the path selection component 106, and an FC or SCSI driver.

The data storage system 120 includes three FAs 122a-122c and a storage device 130. In this example, the device 130 may include three LVs—LV 5, LV 6, and LV 10. The device 130 may be configured as a single metadevice including three LVs. A metadevice may be more generally characterized as a logical device including one or more other logical devices or volumes. The metadevice is an aggregated device configuration accessible by the host over a connection or path to the data storage system as a single unit. The host or other user of the metadevice is able to access all LVs thereof as a single unit using a metadevice identifier. Each of the LVs included in the metadevice may be generally referred to as a metadevice member. The host may not be able to access each of the individual metadevice members over a path between the data storage system and may rather only be able to access the metadevice as a single aggregated unit. For example, if LV 5, LV 6 and LV 10 are each 100 GBs, the metadevice has a total capacity of 300 GBs. To the host, the metadevice is accessible as a single logical storage device having 300 GBs of storage capacity. In one embodiment, a single LV of the metadevice may be designated as the metahead or exposed member associated with an address and/or other identifier visible to the host. As such, the host may access the metadevice as a single aggregated unit using the identifier associated with exposed metahead. For example, LV 5 may be designated as the metadevice metahead member and the host may access the metadevice using the identifier for LV 5. It should be noted that the metadevice may be further configured such as, for example, by associating one or more additional LVs with the metadevice thereby adding the one or more other LVs to the metadevice 130. For example, at a later point in time (not illustrated in FIG. 3), metadevice 130 may have its storage capacity expanded by adding LV 90. The metadevice 130 may be represented as having storage for LV 90 following LV 10 (e.g., first storage location of LV 90 logically follows last storage location of LV 10). It should be noted that each of the LVs may be located on a same physical device or one or more different physical devices. Also, each FA may have one or more ports through which the metadevice may be accessible although only one such port of each FA is used in the illustrated example. For example, suppose that metadevice 130 is accessible through 2 ports of FA1 122a rather than 1 port of FA1 122a as illustrated. In this case, metadevice 130 may be accessible over a fourth path from A1 to the second additional port of FA1 122a.

In the example 100, the metadevice 130 is configured to be accessible through a port of the three front end directors or interfaces 122a-122c, also denoted respectively FA1, FA2 and FA3. The multiple paths allow the application I/Os to be routed over multiple paths and, more generally, allow the metadevice 130 to be accessed over multiple paths. In the event that there is a component failure in one of the multiple paths, application I/Os can be easily routed over other alternate paths unaffected by the component failure. Thus, an embodiment of the path selection component 106 may also perform other processing in addition to preferred path determination connection with path selection. The component 106 may be aware of, and may monitor, all paths between the host and the metadevice 130 in order to determine which of the multiple paths are active or available at a point in time, which of the multiple paths are unavailable for communications, and to use such information to select a path for host-data storage system communications.

In the example 100, the metadevice 130 may be configured as accessible through three paths. Each path may be represented by two path endpoints—a first endpoint on the host 102 and a second endpoint on the data storage system 120. The first endpoint may correspond to a port of a host component, such as a director on the host 102, and the second endpoint may correspond to a port of a data storage system component, such as a port of an FA of the data storage system 120. In the example 100, elements A1, A2 and A3 each denote a port of a host 102 (e.g. such as a port of a host bus adapter or HBA), and elements B1, B2 and B3 each denote a port of an FA of the data storage system 120. The metadevice 130 may be accessible over a first path represented by A1-B1, a second path represented by A2-B2 and a third path represented by A3-B3.

Figure 4:
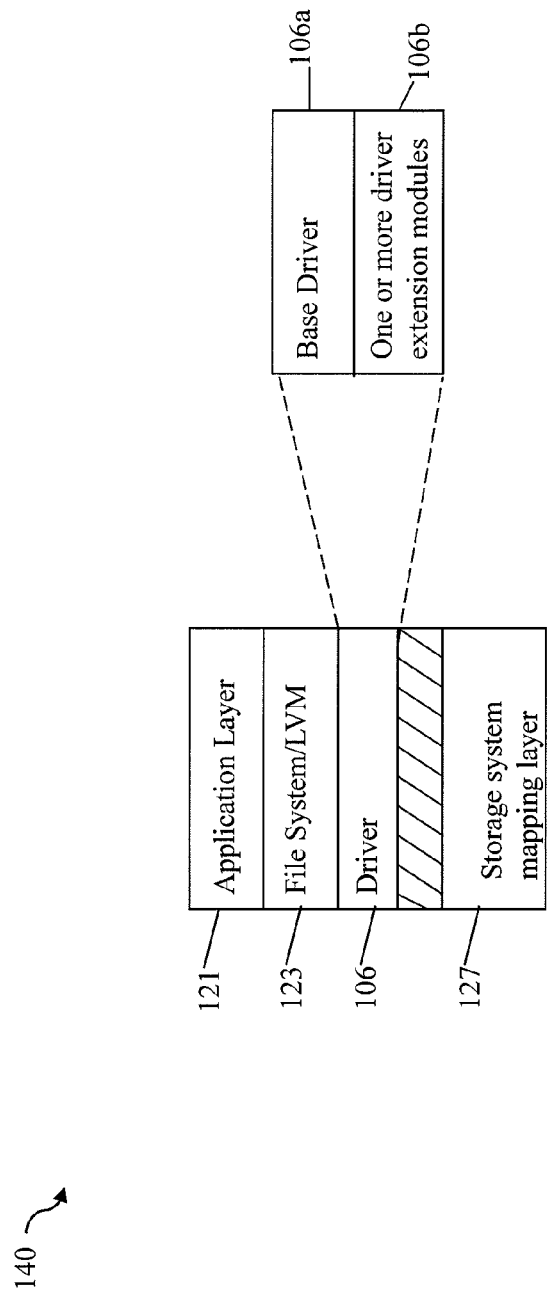
FIG. 4 is an example of software layers that may be included in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the driver, path selection component 106, of FIG. 3. The system includes an application layer 121 which includes application programs executing on the host computer 102. The application layer 121 may refer to storage locations using an associated label or identifier such as a file name. Below the application layer 121 is the file system/LVM layer 123 that maps the label or identifier specified by the application layer 121 to an LV which the host may perceive as corresponding to a physical device address (e.g., the address of one of the disk drives) within the storage system 12. Below the file systein/LVM layer 123 is the driver 106 which handles processing of the I/O received from layer 123. The driver 106 may include a base driver 106*a* and one or more driver extension modules 106*b*. The driver 106 may be included in a commercially available product such as EMC® PowerPath® software. Functionality for performing multipathing operations such as may be performed by EMC® PowerPath® software may be included in one of the extension modules 106*b* such as a multipath (MP) extension module. As described above, the MP extension module may perform processing in connection with multiple path management and selecting one of a plurality of possible paths for use in connection with processing I/O operations and communicating with the data storage system, such as 120 of FIG. 3. The layer 123 may provide for mapping an LV as presented by the data storage system to the host to another logical data storage entity that may be used by the application layer 123.

In some embodiments, the data storage system 120 may be an intelligent data storage system having its own mapping layer 127 such that the LV passed from the host may not directly correspond to a physical device such as a disk drive. In such embodiments, the LV provided by the host in connection with the I/O operation may be further mapped by the data storage system using its mapping layer 127. For example, an LV provided by the host may be mapped by the data storage system to one or more physical drives, multiple LVs may be located on a same physical device, and the like. In other embodiments, the data storage system may not include such a mapping layer 127.

The driver 106, as well as other components illustrated in FIG. 4, may execute in kernel mode or other privileged execution mode. In one embodiment using a Unix-based operating system, the driver 106 may executed in kernel mode. In contrast, an application may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like.

In operation, an application executing at application layer 121 may issue one or more I/O operations (e.g., read and write operations) to devices, such as LVs. Such I/O operations may be directed to the driver 106 after passing through any intervening layers such as layer 123.

In connection with an embodiment in accordance with techniques herein, communications between an initiator port of the host and a target port of a data storage system may include those related to I/O operations and others related to host control operations. I/O operations may include, for example, read and write operations. Host control operations may include those commands which are not performing I/O with respect to a data storage device (e.g., LV) and include SCSI commands such as, for example, inquiry, mode sense, and read capacity.

As described in more detail in following paragraphs and figures and with reference back to FIG. 3, the techniques herein may be performed by the path selection component 106 to select one of the foregoing three paths when sending an I/O operation from the application 104 to the metadevice 130. In making such a selection in an embodiment in accordance with techniques herein, the component 106 may also use additional information about the metadevice members. The component 106 may use this additional information about the metadevice and its members in order to perform a mapping as described below. Based on the result of this mapping, the component 106 may determine the particular metadevice member to which an I/O operation is directed and use a preferred path selection technique and criteria to select a path. As described below, such selection criteria may include whether a metadevice member's device table or device descriptor information as stored in the data storage system is physically located on a same component board (of the data storage system) as a component including a target port of a path. As described in more detail elsewhere herein, device tables (also referred to as device descriptor information) may store a variety of different information for devices of the data storage system and such information is used by different components of the data storage system when servicing an I/O operation directed to such devices.

The techniques herein will be illustrated with respect to a metadevice which is a striped metadevice. With a striped metadevice, data of the metadevice may be striped sequentially across metadevice members. It should be noted that this striping may refer to how a metadevice logical address as used by a host (e.g., host LBA for a metadevice) is mapped to a corresponding metadevice logical address as used by the data storage system (e.g., metadevice member and offset of LBA within the member). The foregoing striping used in connection with mapping a metadevice logical address may be performed in addition to, and independent of, any underlying striping as may be performed for data protection purposes such as in connection with a RAID technique that may be performed on the data storage system. Data that is striped may be stored in portions or chunks so that a single stripe or row of data striped across all device members includes storing a single chunk on each device member. This is illustrated in more detail below.

It should be noted that an embodiment may use a striped metadevice in accordance with an expected locality of reference for data operations performed on the metadevice. Locality of reference may be characterized as describing a principle where "related" storage locations are frequently accessed. Storage locations may be "related" in a variety of different ways. In connection with striped metadevices, it may be expected that data which is located sequentially may be accessed sequentially, such as in ascending order. As such, data may be sequentially striped or spanned across different metadevice members so that when accessing a current data block stored on a first LV, a next sequential data block may be accessed using resources associated with a second LV different than the first LV. It should be noted that an embodiment may include one or more other modes for striping and mapping data across metadevice members depending on expected data access patterns.

Figure 5:
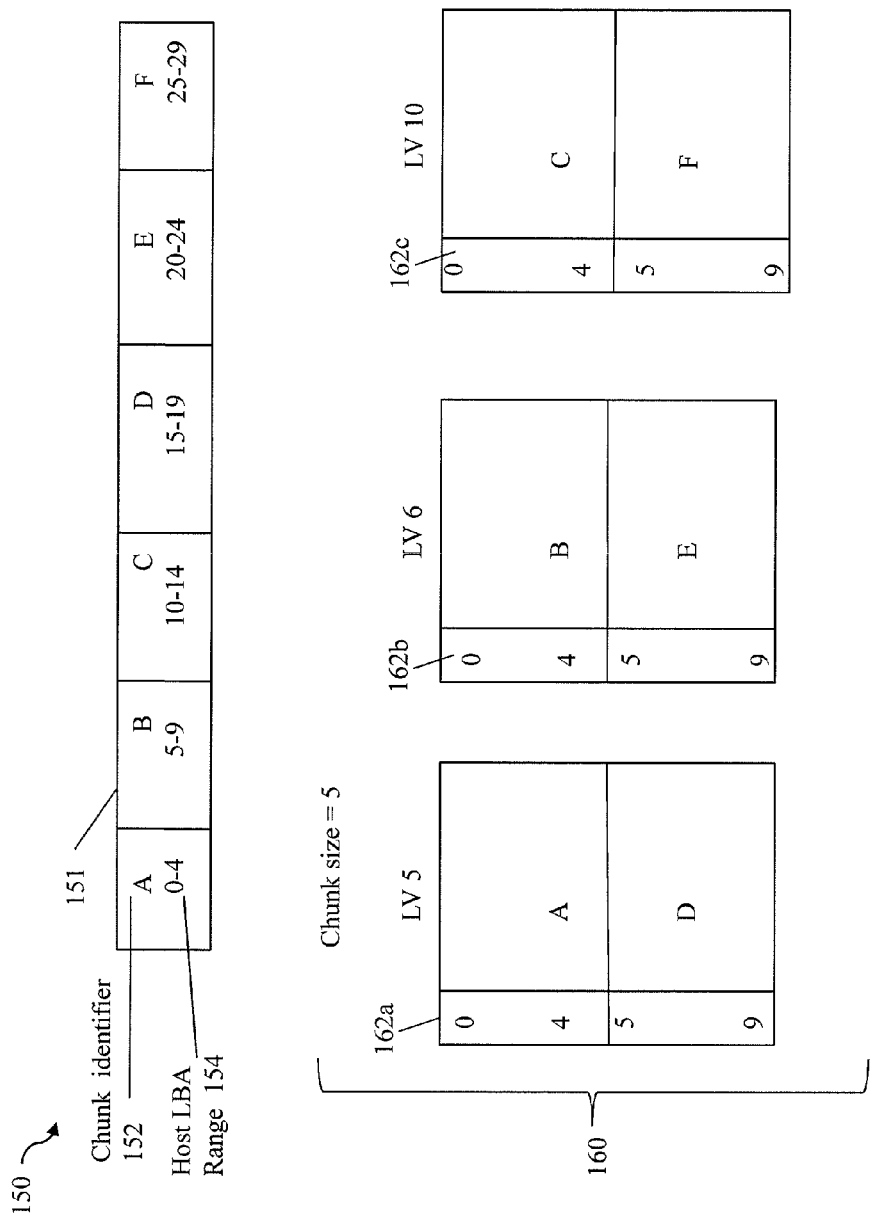
FIGS. 5, 6 and 10B are examples illustrating mapping that may be performed in connection with an embodiment in accordance with techniques herein.

Referring to FIG. 5, shown is an example illustrating metadevice logical addressing from a host's view point and a data storage system's view point for a striped metadevice. The example 150 may further illustrate the mapping of metadevice 130 of FIG. 3 comprising LV 5, LV 6 and LV 10. In the example 150, each of the LVs—LV 5, LV 6 and LV10—is configured to have a storage capacity of 10 units such as 10 blocks of storage and therefore the total metadevice capacity is 30 blocks. The metadevice 130 in this example may have a chunk size of 5 blocks. The data of the metadevice 130 may be stored on the metadevice members in chunks as illustrated by 160. In connection with 160, each of the identifiers A, B, C, D, E and F denotes a chunk identifier corresponding to a chunk of the metadevice data stored on each of the device members. Elements 162a, 162b and 162c denote the LV offsets or locations corresponding to the chunk denoted by one of the identifiers A-F. Elements 162a, 162b, 162c denote the offsets for each of the LVs as used by the data storage system to determine a location. Element 151 illustrates a mapping of the host LBA range 154 for the metadevice to corresponding chunks A-F denoted by the chunk identifiers of 152. The metadevice's logical address range from the host's view point (e.g., host LBA range) is partitioned into multiple chunks A-F spanning the host LBA range 154. With reference to 160, data chunks A-F of the metadevice are stored in stripes or rows across the metadevice members LV 5, LV 6 and LV 10. Given a host LBA in the range denoted by 154 for the metadevice, the data storage system may perform processing for an I/O referencing the host LBA to determine a corresponding mapped data storage system location in terms of an LV and offset within the LV. As described below in accordance with techniques herein, information may be communicated to the host for use in connection with preferred path selection to allow the host to similarly perform such mapping of the host LBA to a corresponding data storage system location (e.g. such as may be expressed for a metadevice using an LV metadevice member and offset within that member).

Recall that a host views the metadevice 130 as a single unit having a single LBA range spanning the entire metadevice. This host viewpoint and metadevice LBA range is represented by the LBA range 154 indicating a host LBA range from 0-29, inclusively. The foregoing viewpoint represents the fact that the host accesses the metadevice as a single logical unit or entity over a connection to the data storage system. For example, in one embodiment in accordance with techniques herein, a metadevice is accessible as a single addressable unit over an FC connection between the host and data storage system. When the FA receives an I/O request for a metadevice, the receiving FA performs processing to map or translate the location in the I/O request as specified by the host's metadevice LBA to a corresponding metadevice member (e.g., an LV), and an address or offset within that member as represented by 162a-c. In this example, the metadevice 130 includes LV 5, LV 6, and LV 10, where each of the foregoing LVs has a capacity of 10 logical blocks, and the metadevice 130 has a total capacity of 30 logical blocks (e.g., LBA range from 0 to 29 inclusively as represented in 154). I/O requests from the application may identify the metadevice as the target using LV 5 (e.g. the metadevice's metahead LV) and may specify a location or offset within the metadevice to which the I/O is directed. The location or offset of the I/O request may specify an LBA in the inclusive range from 0 to 29 (e.g., the host LBA or viewpoint).

Figure 6:
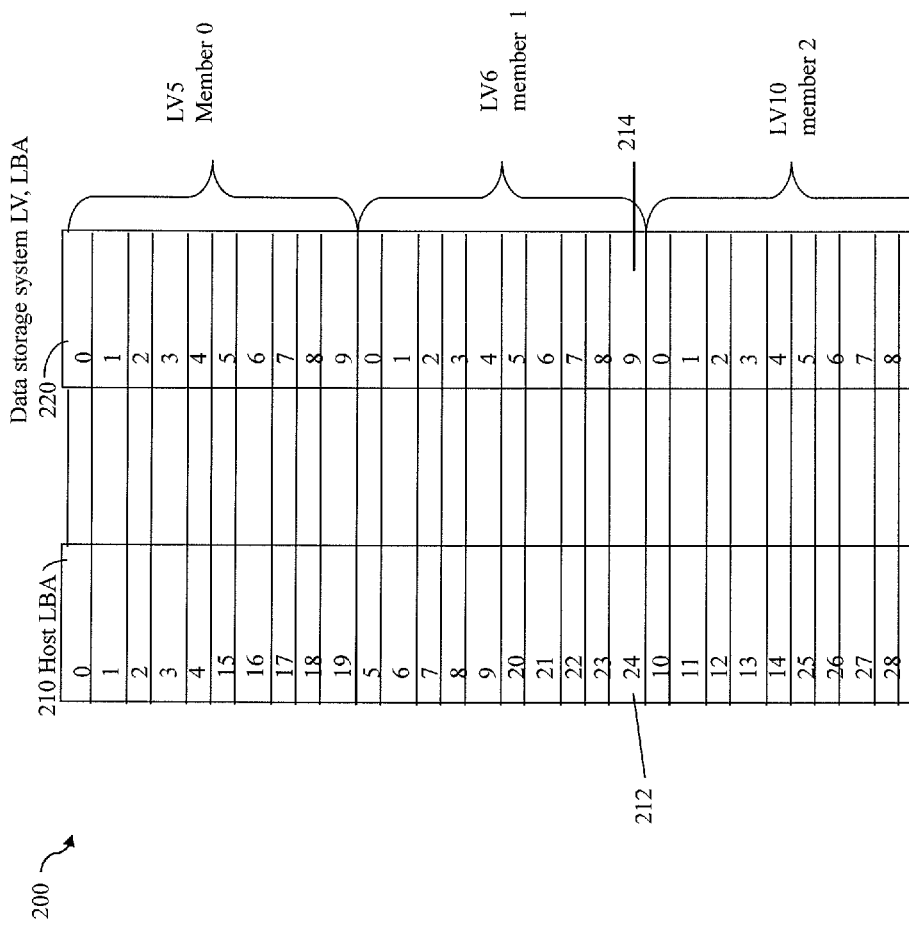

With reference now to FIG. 6, the receiving FA translates the I/O request location as represented by the host LBA (as indicated in a row of column 210) to a corresponding LV and offset or location (as indicated by the same row in column 220), where the LV is the metadevice member, and the LBA represents the offset or location within the member. The example 200 is a further illustration of the mapping of host LBA to data storage system addressing for a striped metadevice as describe in FIG. 5. The example 200 includes a column 210 representing a host's viewpoint or logical block address (LBA) range for the metadevice 130 and a column 220 representing LVs and LBA ranges for the metadevice 130 from the data storage system's view point. Each entry in 210 (host LBA) has a corresponding entry in column 220 (data storage system LVn, LBA) representing a logical address mapping for the metadevice between a host and a data storage system.

To better illustrate, consider an example where an FA receives an I/O request for reading data from a location of the metadevice 130. The I/O request may specify that data is read from LV 5 at a location corresponding to host LBA 24 as represented by element 212. The FA maps the host LBA 212 to a corresponding data storage system LV and LBA or offset within that LV (e.g., LV 6, offset 9) such as represented by entry 214 of column 220.

As will be described in more detail in following paragraphs, an embodiment in accordance with techniques herein may also have the path selection component 106 of FIG. 3 perform processing to determine, for a host LBA of 210, a corresponding metadevice member and LBA or offset within the member, as represented by 220.

When the host sends an I/O request to the data storage system for a metadevice, the I/O request is directed to the metahead of the metadevice since only the metahead is accessible as an addressable entity over the path. In other words, only the metahead has a visible address or identifier to which the host can direct the metadevice I/O request. For example, LV 5 may be the metahead for metadevice 130. I/O requests from the host for metadevice 130 may indicate LV 5 as the target device for the metadevice even though such requests may be to access storage of LV 6 or LV 10. As represented in the example 200 of FIG. 6, each I/O request from the host for metadevice 130 may also specify an offset or location as an LBA within the inclusive range of 0 to 29. Each such I/O request may be sent on a selected one of the three paths and sent to one of the FAs 122a-122c. The receiving FA may then perform processing as described above to map the host LBA of 210 to a corresponding metadevice location, as represented by 220, using metadevice member (e.g., LV) and LBA or offset within the member. The receiving FA may then perform processing to service the I/O operation and may access device descriptor information stored in a device table for the LV or metadevice member.

Figure 7:
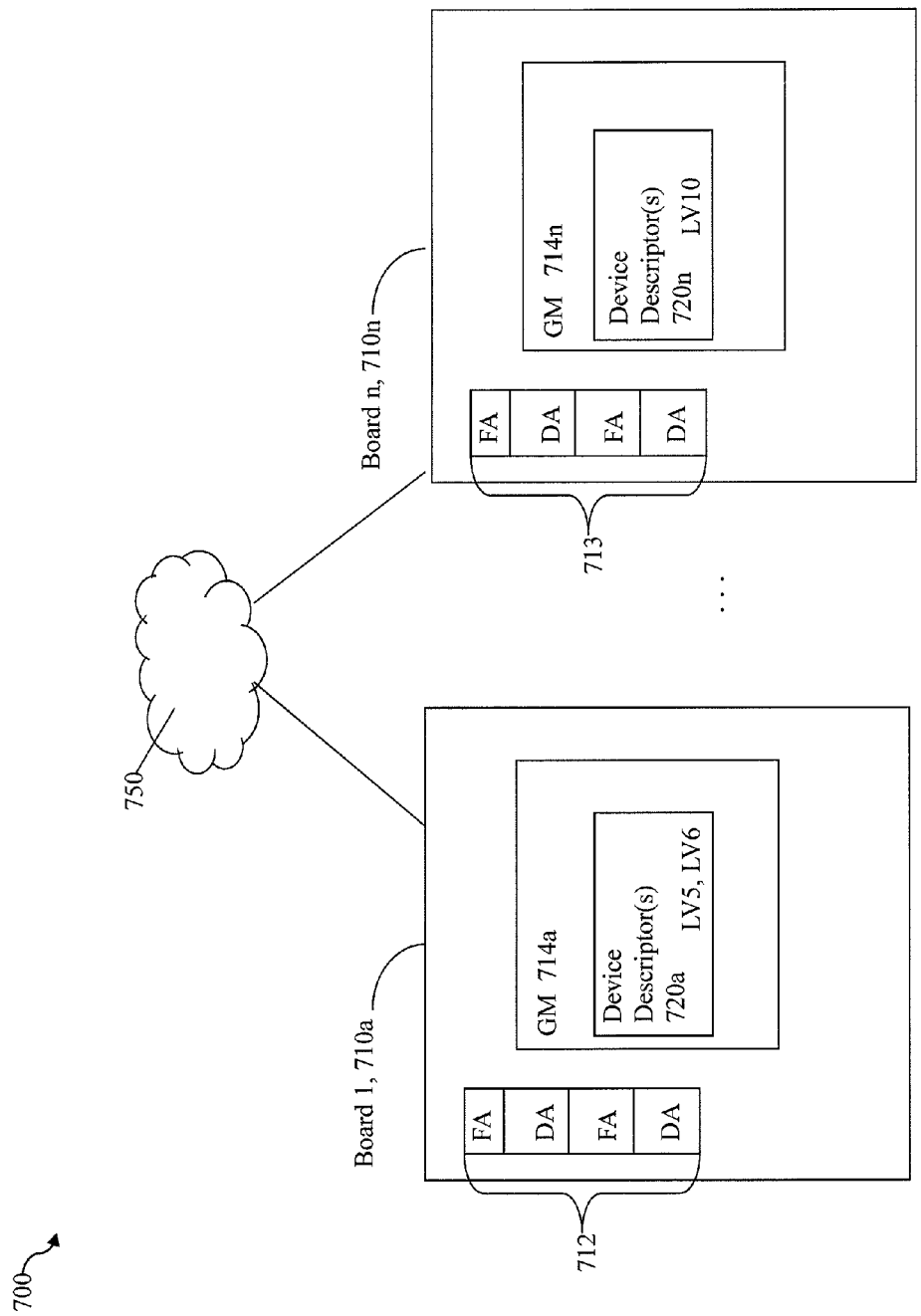
FIG. 7 is an example illustrating distributed global memory portions stored on different physical component boards in an embodiment in accordance with techniques herein.

Referring to FIG. 7, shown is an example of director boards as may be included in an embodiment in accordance with techniques herein. In this example 700, the data storage system may include a plurality of director boards 710a-710n. Each of the boards 710a-710n may be a physical board including components thereon as illustrated. In particular, each of the boards may include one or more directors and a portion of global memory so that global memory may be distributed across multiple director boards. For example, board 710a may include a plurality of directors 712 of the same or different director types (e.g., all DAs, all FAs, or both DAs and FAs illustrated directors of different types). Board 710a may also include a portion of global memory (GM) 714a. Stored in GM 714a may be information, such as device descriptors 720a, accessed and used by directors and other components of board 710*a* as well as other components of other boards, such as 710*n*. The boards 710*a*-710*n* may communicate over a fabric 750 to access global memory. The fabric 750 may include, for example, a switch and connections between the switch and boards 710*a*-710*n*. Device descriptors of 720*a* and 720*n* may contain information used by an FA or other director when performing I/O operation processing directed to a particular LV. For example, device descriptor information may identify whether the device is online or ready. The device descriptor information may also include information for each portion of the track, such as for each track of the device. Such information may include, for example, whether data from the track is in cache, whether data for the track stored in cache is write pending, and the like. Device descriptors 720*a*, 720*n* may also be referred to as device tables containing information about data storage system devices as described above.

In connection with the foregoing, a device descriptor for each logical device or LV may be stored within global memory of the data storage system. However, since the global memory is distributed across multiple director boards, each device descriptor stored in global memory may physically reside on a different one of the director boards. As such, the cost for a director, such as an FA, to access a particular device descriptor in global memory may vary depending on whether the particular device descriptor is located in a global memory portion residing on the same physical board as the requesting FA or a different physical board. If the requesting FA is located on the same physical board as the global memory portion containing the desired device descriptor, then the cost for the FA to access the desired device descriptor is less than the cost (e.g., access time and resources) would be for the same FA to access a descriptor located in a global memory portion on a different physical board. For example, assume the metadevice 130 of FIG. 3 is as described above and includes LV 5, LV 6 and LV 10. The device descriptors for LV 5 and LV 6 may be located in GM portion 714*a* and the device descriptor for LV 10 may be located in GM portion 714*n*. As such, cost associated with a first FA of 712 accessing device descriptors for LV 5 and LV 6 (in 720*a*) is less than a cost associated with a second FA of 713 accessing device descriptors for LV 5 and LV 6 since the second FA of 713 communicates over the fabric 750 to access the device descriptors included in 720*a*. As such, an embodiment may determine a path as "preferred" for a particular metadevice member or LV based on whether the LV's device descriptor information is stored in a global memory portion residing on the same physical board as the FA of the path. For example, any path using an FA of 712 may be considered preferred with respect to accessing metadevice members LV 5 and LV 6 since the device descriptors for LV 5 and LV 6 reside in 720*a* on GM portion 714*a*. Similarly, any path using an FA of 713 may be considered preferred with respect to accessing metadevice member LV 10 since LV 10's device descriptor resides in 720*n* of GM portion 714*n*. Thus, a path may be considered preferred based on whether the FA of the path may access device descriptor information stored locally, or on the same board as the FA.

In accordance with techniques herein and with reference back to FIG. 3, an embodiment may have the host 102 perform processing to obtain configuration and other information as used and described herein. For example, each FA of the data storage system 120 may return information to the host 102 regarding which devices of 102 are accessible or visible to the host on which path(s), device information such as device capacity, whether a device is a metadevice, which LVs are members of the metadevice, capacity information for each metadevice member, information identifying which host LBA ranges of a metadevice correspond to which metadevice members, which device descriptor tables and FAs are stored on which physical boards, and the like. Such information may be returned to the host, for example, in response to SCSI inquiry and/or other commands.

In an embodiment in accordance with techniques herein, the path selection component 106 may receive and use information returned by the data storage system to determine which Host LBA ranges (e.g., corresponding to the host logical addressing scheme for the metadevice) correspond to which metadevice members (e.g., as used by the data storage system's addressing scheme) and which one or more FAs are included in preferred paths for the metadevice members based on whether the FA is located on a same physical board as a metadevice member's device descriptor information (as stored in distributed global memory portions). Using this information, the path selection component 106 may perform mapping of a host LBA, such as of a metadevice, to a corresponding LV and offset/LBA as used by the data storage system to determine which one or more paths (and target FAs of those paths) are preferred for use with which one or more LVs of a metadevice. Accordingly, the host may, for example, select to send an I/O to an FA from multiple FAs capable of servicing the I/O in accordance with which metadevice member the host's LBA/address maps to, and whether an FA is located on a same physical board as the GM portion including the metadevice member's device descriptor information.

What will now be described is information that may be returned to the host by the data storage system in connection with the host obtaining preferred path information. In one embodiment in accordance with techniques herein, the host may query each target port of an FA of the data storage system, with respect to each device visible or accessible through the target port, for such preferred path information in accordance with what device descriptors are stored locally on the same physical board as the FA. In response, the information returned may include one or more parameters used by the host to perform mathematical calculations in order to determine a preferred path for different portions of the host LBA range for the metadevice. As noted above, the host may obtain a list of metadevices via discovery processing and perform additional commands to obtain the information used for preferred path determination for each such metadevice.

In one embodiment, the information returned to the host by a single FA port for a metadevice may include a first parameter identifying a number or quantity of metadevice members and a chunk size. With reference back to the example illustrated in connection with FIGS. 3, 5, 6, and 7 for the metadevice 130, the first parameter may be 3 corresponding to the 3 LVs (LV 6, 7 and 10) for the metadevice and the second parameter may be 5 indicating 5 blocks as the chunk size. It should be noted that the chunk size may be in other units besides blocks provided herein for illustration. Additionally, the information returned by the FA port may identify a list of one or more LVs of the metadevice having their device descriptor information stored in a GM portion residing on the same physical board as the FA containing the quereied FA port. Thus, for a path from the host which includes the FA port as the target, the list indicates for which LVs such a path is considered a preferred path. The host may use the first and second parameters to determine which host LBA ranges of the metadevice map to which LV metadevice members. Additionally, the host may use the lists returned by the FA ports to determine which FAs (and ports thereof) are located on the same physical board as which LV device descriptor information. Using the foregoing, the host may determine a preferred path of a host I/O directed to a host LBA of the metadevice.

Consider the example illustrated in connection with FIGS. 3, 5, 6, and 7 described above where FA1 122a and FA2 122b of FIG. 3 reside on board 1, 710a of FIG. 7, and FA3 122c resides on board n, 710n of FIG. 7. The host may query FA1 122a for preferred path information regarding the metadevice 130 of FIG. 3. In response, the host may receive information including the first parameter having a value of 3 (e.g., corresponding to the 3 LVs—LV 5, 6, and 10—for the metadevice) and the second parameter having a value of 5 (e.g., indicating 5 blocks as the chunk size) as described above. Additionally, the returned information may indicate that LV 5 and LV 6 have their device descriptor information stored on the same board 1, 710a, as the queried FA1 122a. Such information may also be similarly returned in response to the host querying FA2 122b. The host may also query FA3 122c located on board n, 710n. In response, the host may receive information including the first parameter having a value of 3 (e.g., corresponding to the 3 LVs—LV 5, 6, and 10—for the metadevice) and the second parameter having a value of 5 (e.g., indicating 5 blocks as the chunk size) as described above. Additionally, the returned information may indicate that LV 10 has its device descriptor information stored on the same board n, 710n, as the queried FA3 122e.

The host may perform an I/O operation directed to a host LBA of the metadevice. The host may perform processing to determine a preferred path over which to direct the I/O operation. For the host LBA of the metadevice, the host may determine the metadevice member or LV to which the host LBA is mapped using the first and second parameters. The host may determine a stripe size or size of a row across all the metadevice members by multiplying the first parameter by the second parameter as returned previously by the FA port when queried for preferred path information for the metadevice. The stripe size may be represented as:

$$\text{stripe size} = \text{number of metadevice members} * \text{chunk size} \quad \text{EQUATION 1}$$

where "stripe size" is the stripe size or size of a row in terms of units of storage (e.g., such as blocks) across all metadevice members, "number of metadevice members" is the number of LVs or metadevice members as indicated by the first parameter described above, and "chunk size" is the size of a chunk as indicated by the second parameter described above. With respect to the example described above, the stripe size is 15 blocks (e.g., 3*5, where 3 is the number of metadevice members and 5 is the chunk size).

Using the stripe size, a second calculation may be performed to determine the stripe or row number associated with the host LBA, where such stripes are rows denoted by consecutive integers beginning with 0 (e.g., 0, 1, 2, 3, . . . ). The stripe or row number may be represented as:

$$\text{Stripe \#} = (\text{INT\_QUOTIENT}(\text{host LBA}/\text{stripe size})) \quad \text{EQUATION 2}$$

where "host LBA" is the host LBA of the I/O operation, "stripe size" is as determined using EQUATION 1, and "INT_QUOTIENT" represents the integer quotient resulting from dividing host LBA by the stripe size, where there is rounding down to the nearest such integer. With respect to the example above with reference to a host LBA 24 (as represented by element 212 of FIG. 6), the stripe it is 1 as determined using EQUATION 2. (e.g., the INT_QUOTIENT of (24/15) which is 1). Thus, the host LBA=24 maps to stripe or row 1 which includes chunks D, E and F as identified by element 160 of FIG. 5. It should be noted that stripe or row 0 includes chunks A, B, and C. The stripe # represented using EQUATION 2 may also represent a coordinate identifying a logical vertical position of a mapped host LBA in the representation of FIG. 5.

An offset within the row or stripe # identified by EQUATION 2 may be represented as:

$$\text{stripe offset} = \text{host } LBA - (\text{stripe size} * \text{stripe \#}) \quad \text{EQUATION 3}$$

where "host LBA" is the host LBA of the I/O operation, "stripe size" is as determined using EQUATION 1, and "stripe #" is as determined using EQUATION 2. With respect to the example above with reference to a host LBA 24 (as represented by element 212 of FIG. 6) having a stripe #=1 and stripe size=15, the host LBA=24 has a stripe offset of 9 as determined using EQUATION 3 (e.g., 24−(15*1)). With reference to FIG. 5, the stripe offset indicates a horizontal position or offset within stripe 1 located in chunk E. In order to determine the member device or LV containing the stripe offset, the stripe offset of EQUATION 3 may be used as represented in EQUATION 4:

$$\text{member \#} = \text{INT\_QUOTIENT}(\text{stripe offset}/\text{chunk size}) \quad \text{EQUATION 4}$$

wherein "member #" identifies one of the metadevice members (where member #0 corresponds to LV 5, member #1 corresponds to LV 6 and member #2 corresponds to LV 10), "INT_QUOTIENT" and "chunk size" are as described above, and "stripe offset" is determined using EQUATION 3. With respect to the example above with reference to a host LBA 24 (as represented by element 212 of FIG. 6) having a stripe #=1, stripe size=15, stripe offset of 9, the member number is 1 (as determined using EQUATION 4, the quotient of (9/5)). With reference to FIG. 5, the stripe offset indicates a position or offset within stripe 1 located in chunk E on metadevice member 1, LV 6.

The host may perform the foregoing calculations using the first and second parameters to determine which metadevice member LV corresponds to, via the logical address mapping as described above, a host LBA for the metadevice. The host may then determine using the additional lists returned by the FA ports, for the metadevice member LV, which one or more FA ports (through which the member LV is exposed or visible) are located on a same physical board as the member LV's device descriptor. As will be described below in more detail in connection with variations of the techniques herein, a location within the particular metadevice member LV may also be determined for the host LBA. For example, EQUATION 4 above uses the integer quotient of (stripe offset/chunk size). The integer remainder portion of this calculation may also be determined and this remainder represents that offset or location within a chunk stored on a metadevice member LV, where the chunk is included in a stripe represented by EQUATION 2. As may be needed, the host may also determine the metadevice member LV offset based on the stripe # (e.g. host LBA maps to the second row of chunks within LV 6 at offset 4, each chunk being 5 blocks, therefore the host LBA maps to LV 6 at LV offset 9 (5+4)).

Figure 8:
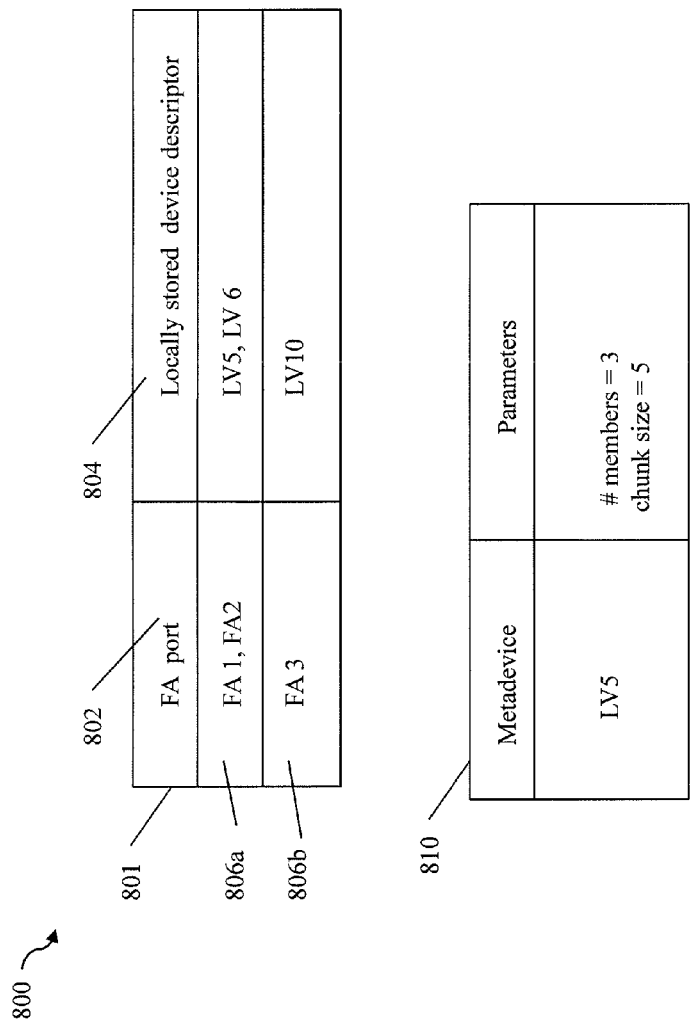
FIGS. 8 and 9 are examples illustrating preferred path information that may be used in an embodiment in accordance with techniques herein.

Continuing with the example above and with reference to FIG. 8, the example 800 includes tables 801, 810 of information as may be stored on the host. The table 801 identifies which device descriptors are stored locally on a same physical board as a corresponding FA port. Column 802 includes a list of FA ports queried by the host. Column 804 includes a list of corresponding device descriptors. Each of rows 806a, 806b indicate one or more FA ports in column 802 which are located on a same physical board as one or more corresponding device descriptors identified in column 804 of the same row. With the example above for host LBA 24 of the metadevice, the host may determine that host LBA 24 of the metadevice maps to LV 6 by performing the calculations described above. The host may then determine, using the information of the table 801 in the example 800, that a preferred path for sending the I/O directed to metadevice host LBA 24 includes either a target port of FA1 or FA2 of the data storage system in accordance with which FA port is located on a same physical board as LV 6's device descriptor.

The table 810 includes information about the metadevice. A row in the table 810 may identify for a metadevice of the first column, what values are returned for the first and second parameters as described above from a queried FA port. The parameters of 810 may be used by the host in performing calculations as described above. The tables 801, 810 of FIG. 8 may be populated using the preferred path information returned to the host from the queried FA ports as also described above. The particular LVs included in the metadevice may be obtained using other commands as part of discovery processing mentioned above. As described elsewhere herein in more detail, the information of the parameters of 810 along with a device list of which LVs are included in a metadevice (as reflected in the column 804 of the information of table 801) may be returned by an FA port in response to a query for preferred path information for the metadevice LV5 in an embodiment in accordance with techniques herein. It should be noted that the device list of LVs included in the metadevice may be ordered to reflect the order in which they occur in the metadevice. For example, with reference back to FIG. 5, the LV ordering of the LVs as they are for the metadevice layout may be LV 5, LV 6, LV 10 and the returned device list ordering may accordingly reflect this. As a variation, if the device list for the metadevice alternatively had a layout of LV 6, LV 5, LV 10, the returned device list would reflect this alternative ordering (e.g., with reference to FIG. 5 where segments A, D are on LV 6 rather than LV 5, and where segments B, E are on LV 5 rather than LV 6).

The foregoing processing and information for preferred path determination may be used in an embodiment where the device descriptors stored in GM of a data storage system remain in the same physical location within GM. In other words, each device or LV has its device descriptor information stored in a GM portion and such information may not be relocated to another GM portion on a different board or to a different location in the same GM portion (e.g., on the same board). The foregoing techniques for preferred path determination in accordance with locality of FA port with respect to device descriptor information may also be utilized in an embodiment where the device descriptors stored in GM may be relocated during operation of the data storage system to either another GM portion on a different board or a different location within the same GM portion (e.g., on the same board). Device descriptors may be relocated, for example as a result of paging device descriptors in/out of GM to disk or other storage based on usage. Such paging of device descriptor information out of GM to disk or other slower access storage may be performed based on, for example, how recently and/or frequently a particular device descriptor is utilized, as well as other factors. In this latter case where the device descriptors may be relocated in GM, the host may poll periodically to obtain up-to-date preferred path information as described herein for the devices.

Figure 9:
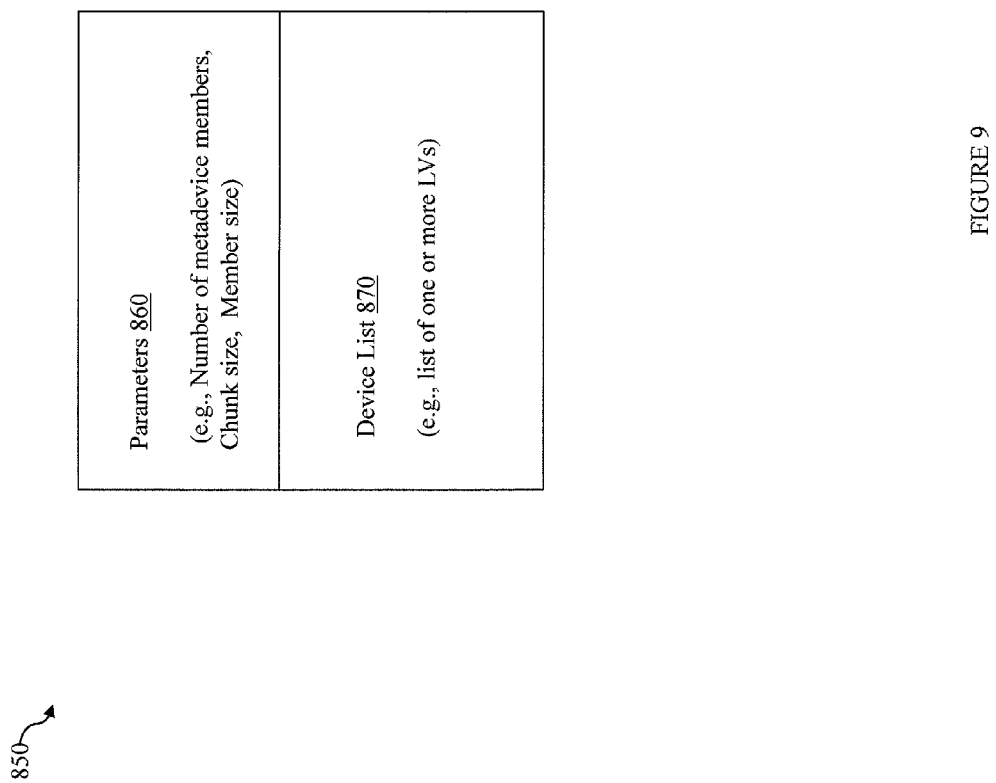

Referring to FIG. 9, shown is an example of information 850 that may be returned by an FA port in response to a query for preferred path information for a metadevice in an embodiment in accordance with techniques herein. The example 850 illustrates the information described above as may be returned by an FA port to a host and includes parameters 860 and a device list 870. The parameters 860 may include the first and second parameters as described above corresponding, respectively, to a number of metadevice members and a chunk size. Optionally, an embodiment may return a third parameter indicating member size such as number of blocks or storage capacity of each metadevice member. For example with reference back to FIG. 5, the third parameter may be 10 blocks since each of the LVs 5, 6, and 10 are 10 blocks. The third parameter is not needed in performing the particular calculations described above for the host to map a host LBA for the metadevice (e.g. host logical address) to a corresponding metadevice member and offset within the member (e.g., corresponding data storage system address). However, the third parameter may be used in verifying an aspect of the metadevice members and may be checked by the host against other information returned for the metadevice and/or LVs thereof such as related to device capacity for the metadevice and/or members thereof as may be returned in connection with other SCSI commands retrieving device characteristics. It should be noted that an embodiment may also include other parameters to optionally perform other verification processing. Additionally, as will be appreciated by those of ordinary skill in the art, an embodiment may return other parameters rather than the specific ones illustrated in FIG. 9 as may be used in performing varied calculations for mapping a host LBA to a data storage system device location.

The device list 870 may be in any one of a variety of different suitable forms. For example, the list 870 may be a list of LVs or devices comprising the metadevice where the list includes a first integer indicating a number of entries in the list followed by the entries, each entry identifying one of the metadevice members having its device descriptor information stored locally in a GM portion located on a same board as the queried FA port that returned the information in the example 850. As noted above, the particular order in which the LVs appear in the list 870 may reflect the layout or order of the LVs within the metadevice.

The preferred path information described in the example 850 may be returned in connection with one or more commands and/or responses between the host and data storage system in accordance with the particular standard that may be implemented in an embodiment. For example, a version of the SCSI standard may include a first command to which a response may be sent returning preferred path information in a different form than as described herein. The first command may, for example, provide for supplying the preferred path information by returning a list of subranges of the host LBA of the metadevice having their corresponding device descriptor information stored locally on the same physical board as the queried port (that returned the list). However, such a list returned for each port may have the potential to be unacceptably long. Therefore, an embodiment may use the techniques herein in connection with returning metadevice preferred path information using parameters which the host can then use to determine through calculations performed by the host the particular LBA subranges located on which metadevice members and map a particular host LBA to a corresponding metadevice member and member offset/location as described above. The host may use the result of performing the calculations in combination with the lists (indicating which device descriptor information is stored locally on a same board as which FAs) to determine a preferred path for an I/O operation.

In one embodiment, the first command of the SCSI standard may be used in combination with a second vendor unique SCSI command for returning preferred path information in accordance with techniques herein. In an embodiment in accordance with techniques herein, both the first and second commands may be issued by the host to an FA port with respect to inquiring preferred path information about a particular device. In response to the first command, the data storage system may return either a preferred path indicator for the device inquired about if the device is not a metadevice, or may send a list of LBA subranges as described above if the device is a metadevice. In accordance with the techniques herein, the FA port may not return in response to the first command the LBA subranges in the case where the device is a metadevice. Rather, the FA port may return another response causing the host to issue the second command in accordance with techniques herein.

To further illustrate, the host in an embodiment in accordance with techniques herein may utilize both the first and second commands described above and issue two different preferred path inquiry requests to the FA port. The host may send the first command performing a preferred path inquiry for device LV X to FA port FA1. In response, FA1 returns either 1 (e.g., true, indicating that FA1 is included in a preferred path for LV X) or 0 (e.g., false, indicating that FA1 is not included in a preferred path for LV X). If the host receives 0 in response to the first command, the host may send the second command, the vendor unique SCSI command in accordance with techniques herein. The second command may be further characterized as an extended preferred path inquiry to FA1 for LV X. In response to the second command, FA1 returns either 0 (e.g., indicating that this is not a preferred path for LV X), or alternatively returns the extended preferred path information of the techniques herein such as described and illustrated in FIG. 9 and above. In such an embodiment, it is the combination of both responses to both the first and second commands that may be used to obtain preferred path information in accordance with techniques herein. It should be noted that this is merely one exemplary way in which the preferred path information may be obtained in an embodiment in accordance with techniques herein.

In the example above, the device descriptor information for each device is stored as a single atomic unit in a single GM portion. As variation to the foregoing, an embodiment may divide device descriptor information for a single device into partitions where each such partition may be stored independently of the other partitions. As a result, different partitions of a same device descriptor for a single LV may be stored in different GM portions on different physical boards of the data storage system. In such an embodiment, each partition of an LV's device descriptor may have a corresponding partition identifier.

Figure 10:
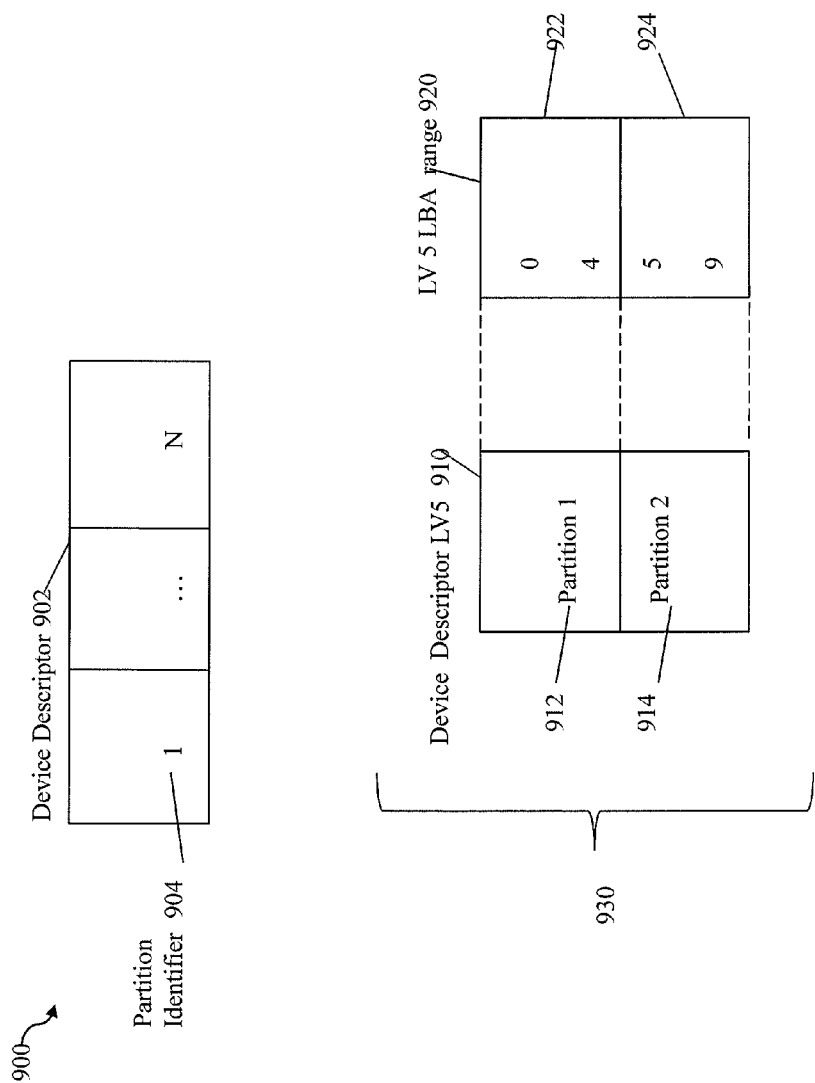
FIGS. 10 and 10A are examples illustrating use of the techniques herein with device descriptors that may be partitioned and stored on multiple global memory portions of different physical component boards of a data storage system in an embodiment in accordance with techniques herein.

Referring to FIG. 10, shown is an example of a device descriptor 902 for a single LV. The device descriptor 902 may be divided into multiple N partitions each of which is denoted by a corresponding partition identifier 904. Rather than have each queried FA port return a list of LVs having their device descriptor information stored in a GM portion on the same board as the FA containing the queried FA port, the list may identify an LV and additionally an associated partition identifier. The additional partition identifier reflects the fact that a particular device descriptor partition is stored in the GM portion rather than the entire device descriptor.

Each partition of the device descriptor may be associated with a portion of the LV as illustrated by element 930 of FIG. 10. For example, consider LV 5 as described above having a capacity or size of 10 blocks (e.g., LV LBA range of 0,9, inclusively) where LV 5's device descriptor 910 is divided into two partitions—partition 1, 912 and partition 2, 914. Each partition 912, 914 may be mapped to a portion of the LV LBA or offset range 920. LV 5 has an LBA range of 0,9, inclusively and may be divided in a similar manner into a number of partitions based on the number of partitions included in the device descriptor 910. LV 5 LBA range 920 may be divided into two equal subranges 922 and 924 where subrange 922 includes LV 5 offsets 0-4 and subrange 924 includes LV 5 offsets 5-9. The first subrange 922 may be mapped to partition 1, 912, of the device descriptor 910 for LV 5. The second subrange 924 may be mapped to partition 2, 914, of the device descriptor 910 for LV 5. Each partition 912, 914 may include device descriptor information for its corresponding subrange 922, 924 of LV 5. Each of the partitions 912, 914 may be stored in different GM portions located on different boards in the data storage system. With reference back to FIG. 9, the host may use the preferred path information returned as described above with the difference that the queried FA ports return device lists 870 which identify not only the LV or device identifier but also the particular partition identifier stored in the GM portion. The host also performs an additional calculation to determine, for a host LBA, the metadevice member LV and LBA/offset within that LV corresponding to the host LBA. As described above, the host may perform this additional calculation to determine the LBA/offset within the metadevice member LV using the first and second parameters and other values determined indirectly therefrom.

Figure 10A:
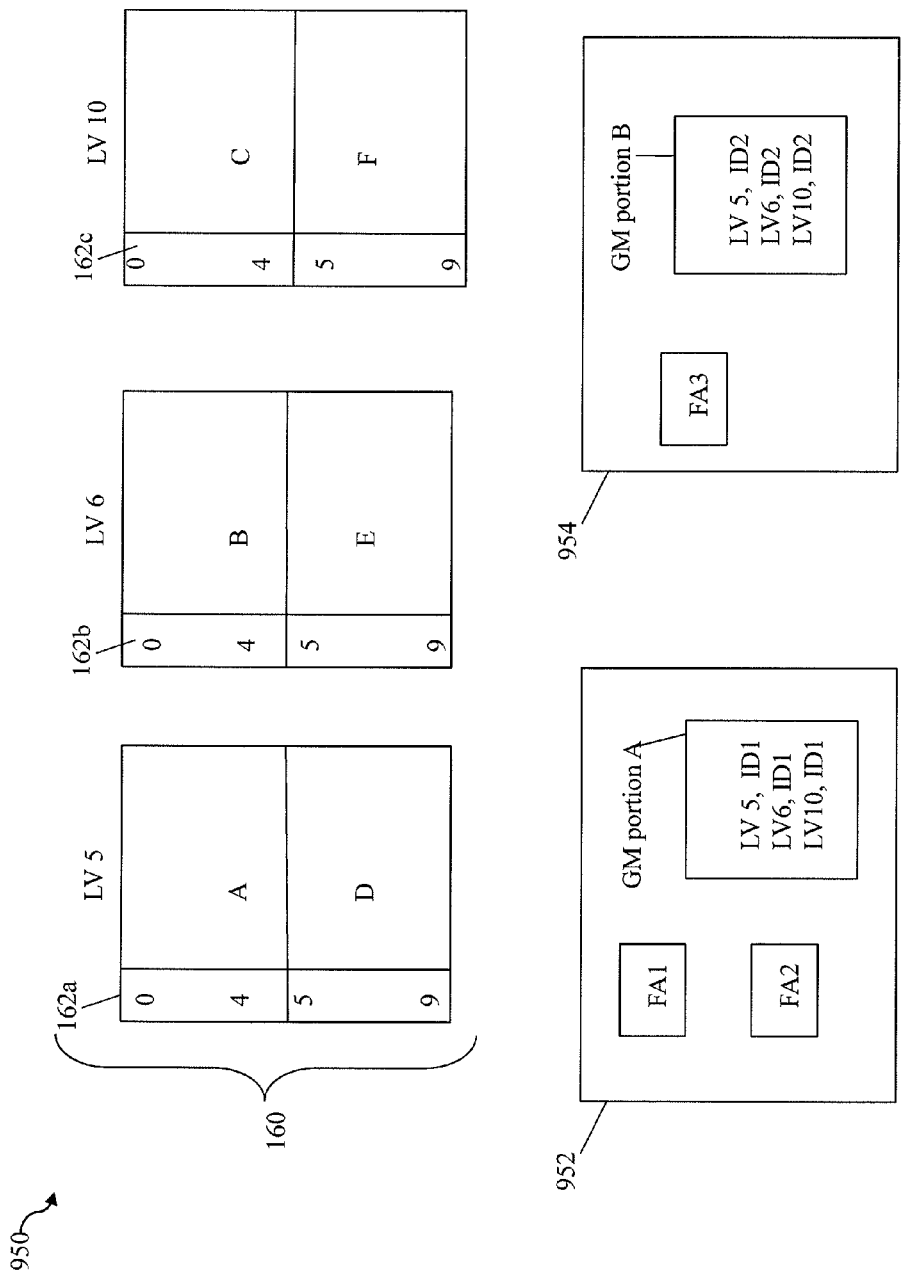

To further illustrate, reference is made to FIG. 10A including example 950. The example 950 includes element 160 reproduced from FIG. 5 for this illustration. As described above, element 160 describes how the metadevice comprising LV 5, 6 and 10 may have its data stored on the metadevice members in stripes or rows of chunks denoted A-F, where the ordering or A-F corresponds to the metadevice host LBA range. The metadevice is visible or exposed to the host through three ports denoted FA1, FA2 and FA3. FIG. 10A also includes a first physical component board 952 and a second physical component board 954 of a data storage system. Board 952 includes FA1, FA2 and GM portion A. Board 954 includes FA3 and GM portion B. Device descriptor information for each single LV may be divided into two partitions as described in connection with FIG. 10 so that each of the LVs of 160 have two corresponding partitions of device descriptor information. Therefore, partition 1 of descriptor information for LV 6 includes such information for LV LBA/offsets 0 . . . 4, and partition 2 of descriptor information for LV 6 includes such information for LV LBA/offsets 5 . . . 9. Similar device descriptor partitions exist for LV 5 and LV 10. In this example, the first partition of each LV's device descriptor corresponding to LV LBA/offsets 0 . . . 4 is denoted by "ID1" and the second partition of each LV's device descriptor corresponding to LV LBA/offsets 5 . . . 9 is denoted by "ID2". GM portion A of board 952 includes the first device descriptor partitions (ID1) for each of the LVs 5, 6, and 10. GM portion B of board 954 includes the second device descriptor partitions (ID2) for each of the LVs 5, 6, and 10. With reference back to the example described above, the host may determine that the host LBA=24 for the metadevice maps to a data storage system logical address of LV 6, LBA/offset 9 having its corresponding device descriptor information included in the second partition ID2 of the device descriptor for LV 6. As illustrated in the example 950, the foregoing second partition ID2 for LV 6 is stored in GM portion B of board 954. Thus, the host may determine that a path from the host to a port of FA3 is a preferred path for sending the I/O referencing a host logical address for the metadevice of LBA offset 24.

One of ordinary skill in the art will appreciate variations to the foregoing that may be included in an embodiment in accordance with techniques herein. For example, the device descriptor information for a single device may be divided into any number of partitions. Each device descriptor for each LV may not have a same number of partitions. In this case, each partition may be understood by the host to include information corresponding to a particular predetermined number of blocks so that the number of partitions may increase as the LV capacity increases. The number of blocks corresponding to each device descriptor partition may be predetermined, communicated from the data storage system to the host as an additional parameter, and the like. In a similar manner, different parameters may be communicated to the host to enable the host to formulaically or through calculations determine which host LBA ranges of the metadevice have corresponding device descriptor information stored in which GM portions.

Although the techniques herein are illustrated with respect to a striped metadevice, the techniques herein are not so limited to a metadevice or storing data in accordance with striping. The techniques herein are more generally applicable with any type of logical device having its data stored in portions. Each such portion may correspond to a subrange of the device's LBA range and the techniques herein may be used to provide one or more parameters allowing the host to map a host's logical address to a corresponding data storage system address and to determine the logical data layout for device on the data storage system. Using this in combination with the returned list of devices having device descriptor information (or partitions thereof) stored on a same physical board as an FA (e.g., device list 870 of FIG. 9), the host may determine a preferred path for an I/O directed to a particular host LBA of a device.

Figure 10B:
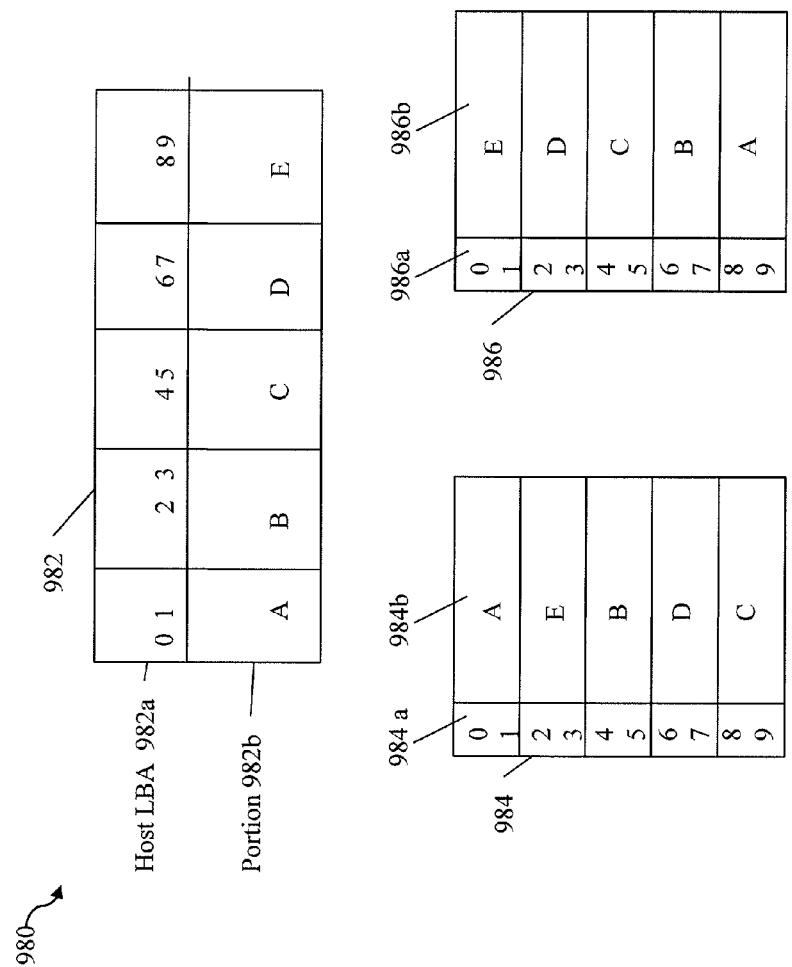

To further illustrate, reference is made to FIG. 10B. In the example 980 of FIG. 10B, a single logical device LV X may have a host LBA range of 0.9. LV X is not striped nor is it a metadevice. Element 982 may represent the host LBA range 0.9 for LV X which is divided into portions of equal size (e.g., 2 blocks each). The 5 portions may be denoted A, B, C, D, and E. As represented in 982, each host LBA 982*a* may map to a corresponding portion denoted by 982*b*. The data storage system may store the 5 portions in accordance with a logical data layout as represented by 984 for LV X. Element 984*a* may denote the offset/LBA within the LV X on the data storage system corresponding to one of the portions A-E, where each such portion is associated with a subrange of the host LBA 982*a* as illustrated by 982. For example, if the host has a write operation to write data to host logical address LV X, LBA=8, the data storage system maps this host address to data storage system logical address LV X, offset 2 and stores the data of the write operation to physical storage corresponding to this data storage system logical address (in portion 13). The particular mapping between the host LBA and the data storage system logical address denoted by 984 orders portions A-E of the host in a manner on the data storage system starting with the first and last portion (e.g., offset zero from the beginning and end of the portion list as denoted by 982) followed by the second portion and the second to last portion (e.g., offset 1 from the beginning and end of the portion list as denoted by 982), and so on, traversing from both ends of the portion list towards the center. The foregoing host to data storage system mapping may be communicated to the host using parameters. For example, there may be a set of predefined mapping schemes understood by the host and data storage system and the data storage system may communicate one or more parameters indicating to the host the one selected mapping used for LV X. For example, the parameters may include a size denoting the size of each of the portions A-E (e.g. 2 blocks) and one or more other parameters indicating the particular ordering of such portions when mapping a host logical address to a data storage system address for that particular LV. For example, if there are 10 predefined mappings, each such mapping may be represented by a different identifier or integer communicated as a parameter to the host. In a rammer similar to that as represented by element 984, element 986 may represent a second possible logical data layout or mapping for the LV X on the data storage system. In connection with 986, the portions are mapped on the data storage system in a reverse ordering from that which is used on the host side. The first possible logical mapping for LV X denoted by 984 and the second alternative logical mapping for LV X denoted by 986 may be predefined mappings understood by the host and data storage system. The data storage system may communicate one or more parameters to the host to indicate which one is used in connection with LV X. Additionally, assuming the device descriptor for LV X is partitioned into two or more partitions as described above, when an FA port of the data storage system is queried for preferred path information, the FA port may communicate information regarding which partition(s) are stored in a GM portion on the same board as the FA containing the FA port as described above.

Figure 11:
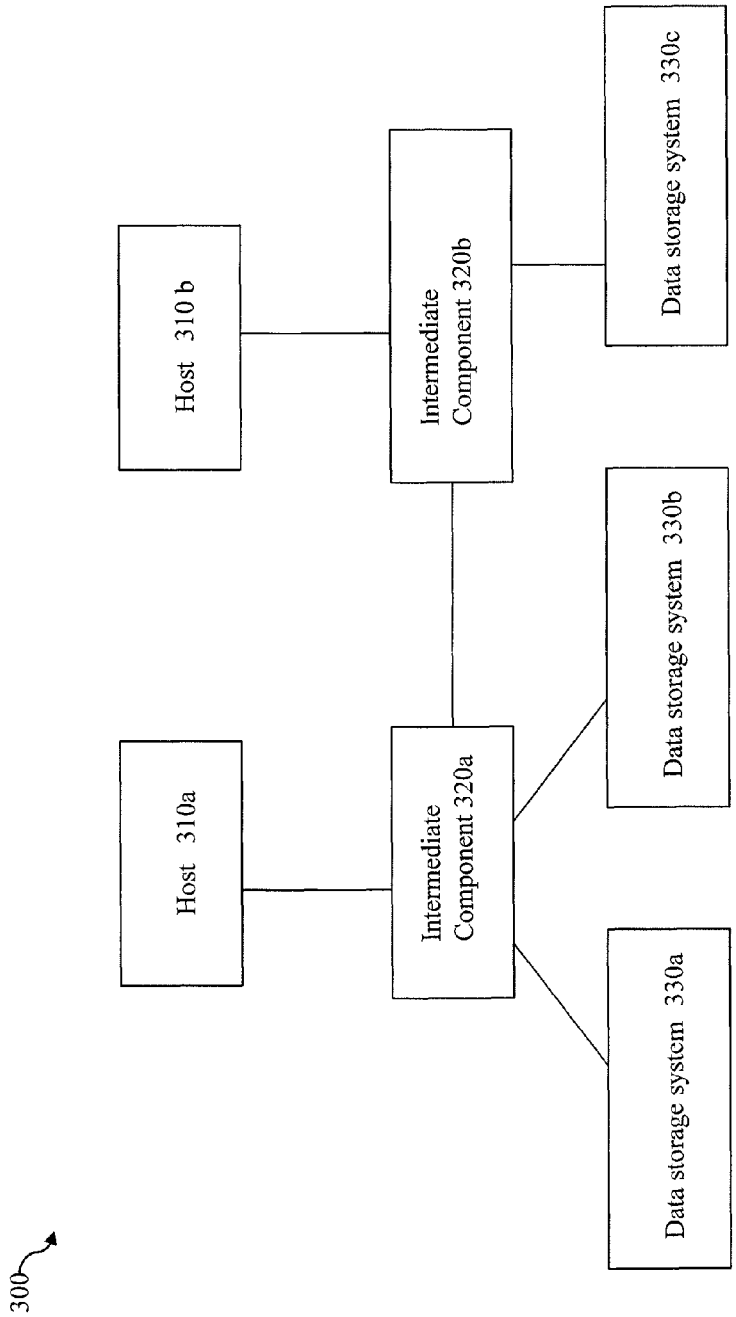
FIG. 11 is an example of another system using intermediate components in an embodiment in accordance with techniques herein.

Referring to FIG. 11, shown is an example of another embodiment that may be used in connection with the techniques herein. The example 300 includes hosts 310*a*, 310*b*, intermediate components 320*a*, 320*b* and data storage systems 330*a-c*. Each of the intermediate components 320*a*, 320*b* may be an appliance and may not provide storage capacity itself. The intermediate components 320*a*, 320*b* may provide for presenting an integrated or collective view of data storage from a plurality of data storage systems and devices connected to the components. Each of the intermediate components 320*a*, 320*b* may be logically located in front of the data storage systems 330*a-c* such as between the hosts 310*a*, 310*b* and the data storage systems 330*a-c* so that the hosts 310*a*, 310*b* access storage of the data storage systems 330*a-c* indirectly through communication with the intermediate components 320*a*, 320*b*. The data storage systems 330*a-c* may be heterogeneous and may be located in the same or different physical locations. In accordance with one aspect, the intermediate components 320*a*, 320*b* provide a level of storage virtualization where the devices of the storage systems 330*a-c* appear to the hosts 310*a*, 310*b* as devices of the intermediate components 320*a*, 320*b*. For example, the data storage systems 330*a*, 330*b* connected to an intermediate component 320*a* may include a Symmetrix™ data storage system represented as 330*a* and a CLARiiON™ data storage system as 330*b*, both from EMC Corporation. The storage view presented to the hosts 310*a*, 310*b* may be such that each such host is unaware of the particular data storage systems or which presented devices are included in which physical data storage system. The intermediate components 320*a*, 320*b* include software executing thereon that controls the I/O flow to/from the devices of the data storage systems 330*a-c*. Furthermore, an embodiment may include multiple intermediate storage components 320*a*, 320*b* as illustrated which are connected in a cluster so that the hosts 310*a*, 301*b* communicating with any one of the intermediate components 320*a*, 320*b* are presented with a unified view of all data storage systems 330*a-c* (and devices of such systems 330*a-c*) connected to the entire cluster of intermediate components 320*a*, 320*b*. Any I/O request from any host 310*a*, 310*b* may be serviced by any one of the intermediate components 320*a*, 320*b* included in the cluster. The intermediate storage components 320*a*, 320*b* may be implemented using VPLEX™ products offered by EMC Corporation.

In connection with the techniques herein, the intermediate components 320*a*, 320*b* may perform processing like that described above as performed by the host in connection with preferred path processing. For example, data storage system 330a may include multiple FA ports over which an LV stored on devices of the system 330 is accessible to a host such as in connection with performing I/Os to the LV. The host 310a may issue an I/O directed to the LV which is communicated from the host 310a to the intermediate component 320a. The intermediate component 320a may perform processing to determine which of the multiple FA ports of the system 330a to use as a preferred path in a manner similar to that as performed by the host described above. The intermediate component 320a may present the LV to the host 310a as a device of the cluster and may not make visible or expose to the host the fact the LV may be accessed through multiple FA ports of the system 330a. In turn, the intermediate component 320a handles FA target port selection if there are multiple ports to access a same device.

It should be noted that the host performing preferred path determination may use the techniques herein alone or in combination with other criteria for selecting a path for use when transmitting an I/O operation from the host to the data storage system.

Figure 12:
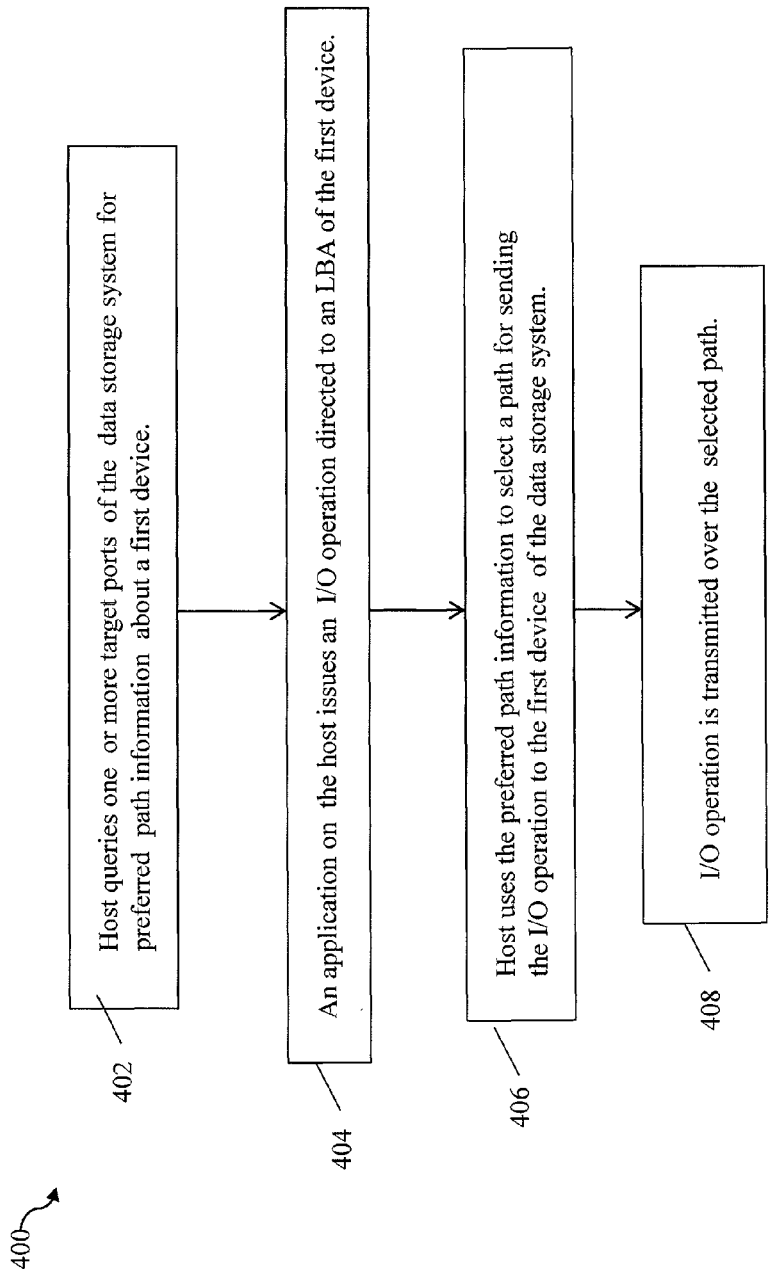
FIG. 12 is a flowchart of processing steps that may be performed in an embodiment in accordance with techniques herein.

Referring to FIG. 12, shown is an example of processing that may be performed in an embodiment in accordance with techniques herein. Flowchart 400 of FIG. 12 summarized processing described above. At step 402, the host queries one or more target ports of the data storage system for preferred path information about a first device. The preferred path information returned may include information such as that illustrated and described for use with techniques herein such as illustrated, for example, in FIGS. 8 and 9 and may also include device descriptor partition-level preferred path indications as described, for example, in connection with FIGS. 10 and 10A. The host may store such received preferred path information for use at a later point in time in connection with determining a preferred path for an I/O operation by using the preferred path information in connection with performing one or more calculations such as to map the host logical address indicated in the I/O operation to a corresponding data storage system logical address. It should be noted that step 402 may be performed periodically depending on whether the location of device descriptor information may change on the data storage system. At step 404, an application on the host may issue an I/O operation directed to an LBA of the first device where the LEA specifies a host logical address. At step 406, the host uses the preferred path information as received in step 402 to determine a preferred path for sending the I/O operation to the first device of the data storage system. For example, if the first device is a metadevice, step 406 may include performing calculations as described above (e.g., using EQUATIONS 1, 2, 3 and 4) to determine the path for transmitting the I/O operation. At step 408, the I/O operation is transmitted to the data storage system over the path selected in step 406.

The techniques herein may be performed by executing code which is stored on any one or more different forms of computer-readable media. Computer-readable media may include different forms of volatile (e.g., RAM) and nonvolatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining preferred paths comprising:
   requesting, by a host from each of one or more ports of a data storage system, first information, said first information including preferred path information for a first device visible to said host through said each port, said preferred path information including one or more parameters used by said host to perform one or more mathematical calculations to determine a preferred path for transmitting to the data storage system a data operation directed to the first device, wherein said one or more parameters of said preferred path information for the first device include a first parameter indicating a quantity of one or more member devices comprising said first device and a second parameter indicating a size of a chunk of data stored on each of said member devices;
   sending, from said each, port to said host, said first information; and
   performing, by said host using said preferred path information received from each of the one or more ports of the data storage system for the first device, said one or more mathematical calculations to determine said preferred path for transmitting, to the data storage system, the data operation directed to the first device, wherein said one or more mathematical calculations performed by the host include a first calculation to determine a stripe size using said first parameter and said second parameter, said stripe size indicating an amount of data stored in a single row across said member devices.

2. The method of claim 1, wherein said one or more parameters include a third parameter indicating a storage capacity of each of said member devices.

3. The method of claim 1, wherein said requesting includes said host issuing a request to each of said one or more ports for preferred path information about said first device.

4. The method of claim 1, wherein each of said member devices is associated with a device table, and wherein said preferred path information for said each port for the first device includes information identifying whether said each port is included in a preferred path for each of said member devices in accordance with whether the device table associated with said each member device is stored in a global memory portion included in a same physical board of the data storage system as said each port.

5. The method of claim 1, wherein each of said member devices is associated with a device table, wherein said device table is partitioned into a plurality of device table portions and wherein each of said plurality of device table portions is stored in a global memory portion and is associated with one of a plurality of logical address portions comprising a logical address range of said first device, and wherein said preferred path information for said each port for the first device includes information identifying whether said each port is included in a preferred path for a first of said plurality of device table portions in accordance with whether the first device table portion is stored in a global memory portion included in a same physical board of the data storage system as said each port.

6. The method of claim 1, wherein said first device is a striped metadevice having its data striped in portions across said member devices, each of said portions being of said size of a chunk indicated by said second parameter.

7. The method of claim 1, wherein said preferred path information for said each port for the first device includes information identifying whether said each port is included in a preferred path for each of said member devices.

8. The method of claim 7, wherein, said preferred path information, includes a list of one or more of said member devices, wherein if a first of said member devices is included in the list, said each port is included in a preferred path to said first member device.

9. The method of claim 1, wherein a logical address range of the first device as used by the host includes a plurality of logical address range portions and said one or more mathematical calculations include one or more calculations used in connection with determining for a data operation directed to a first logical address in the logical address range which of said one or more ports are included in preferred paths for the first logical address.

10. The method of claim 9, wherein said one or more calculations are used in connection with mapping said first logical address from a host logical address space of the first device to a second logical address used by the data storage system.

11. The method of claim 1, wherein a first path to the first device includes a first of said one or more ports and said preferred path information indicates that the first path is preferred for at least a portion of the first device if a portion of a device table for the first device is stored in a global memory portion on a same physical component board as the first port.

12. The method of claim 11, wherein the device table is located in a first global memory portion on a first physical component board at a first time instance and a second global memory portion on a second physical component board different from the first physical component board at a second time instance different from the first time instance.

13. The method of claim 12, wherein the device table is divided into a plurality of partitions, a first of said plurality of partitions is stored in first global memory portion on a first of a plurality of physical boards of the data storage system and a second of said plurality of partitions is stored in a second global memory portion on a second of said plurality of physical boards, said first board being different from the second board.

14. The method of claim 13, wherein each of said plurality of physical boards includes a global memory portion and a plurality of other components, said plurality of other components including at least one component having one of said one or more ports.

15. A non-transitory computer readable medium comprising code stored thereon far determining preferred paths, the non-transitory computer readable medium comprising code for:
  requesting, by a host from each of one or more ports of a data storage system, first information, said first information including preferred path information for a first device visible to said host through said each port, said preferred path information including one or more parameters used by said host to perform one or more mathematical calculations to determine a preferred path for transmitting to the data storage system a data operation directed to the first device, wherein said one or more parameters of said preferred path information for the first device include a first parameter indicating a quantity of one or more member devices comprising said first device and a second parameter indicating a size of a chunk of data stored on each of said member devices;
  sending, from said each port to said host, said first information; and
  performing, by said host using said preferred path information received from each of the one or more ports of the data storage system for the first device, said one or more mathematical calculations to determine said preferred path for transmitting, to the data storage system, the data operation directed to the first device, wherein said one or more mathematical calculations performed by the host include a first calculation to determine a stripe size using said first parameter and said second parameter, said stripe size indicating an amount of data stored in a single row across said member devices.

16. The non-transitory computer readable medium of claim 15, wherein said one or more parameters include a third parameter indicating a storage capacity of each of said member devices.

* * * * *